C. M. WEBB.
VEHICLE SEAT.
APPLICATION FILED AUG. 29, 1917.
1,280,599.
Patented Oct. 1, 1918.
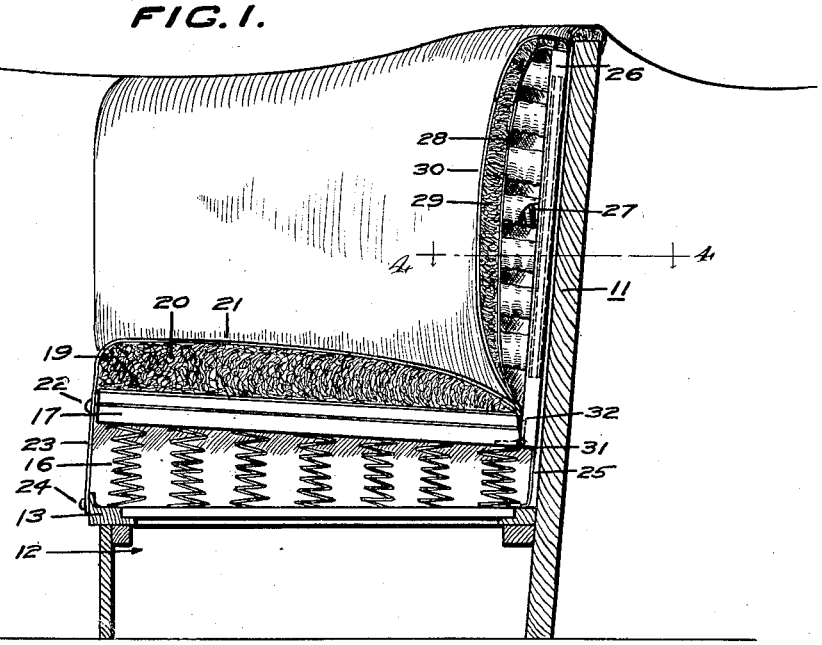
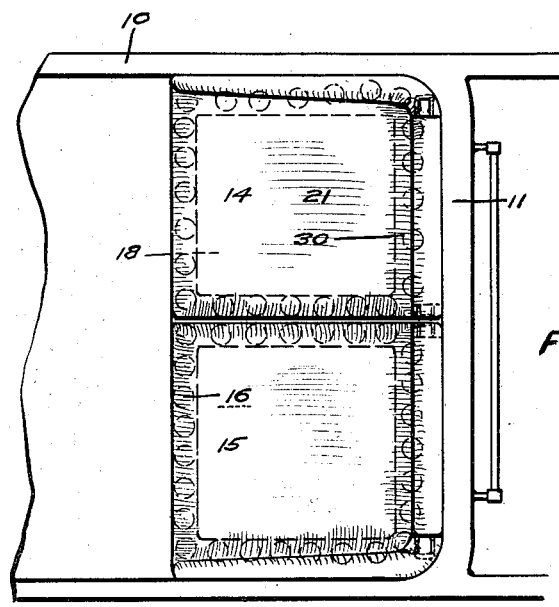
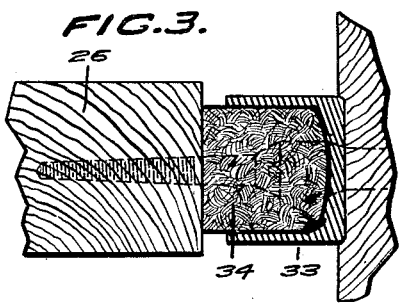
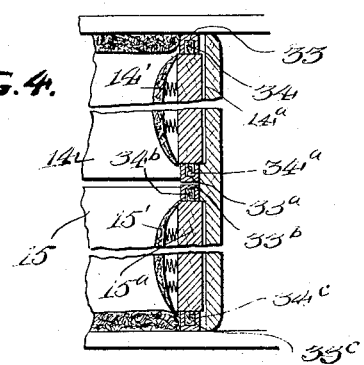
INVENTOR
CHARLES M. WEBB.
BY *Hazard & Miller*
ATTYS

UNITED STATES PATENT OFFICE.

CHARLES M. WEBB, OF LOS ANGELES, CALIFORNIA.

VEHICLE-SEAT.

1,280,599.  Specification of Letters Patent.  Patented Oct. 1, 1918.

Application filed August 29, 1917. Serial No. 188,844.

*To all whom it may concern:*

Be it known that I, CHARLES M. WEBB, a citizen of the United States, residing at Los Angeles, in the county of Los Angeles and State of California, have invented new and useful Improvements in Vehicle-Seats, of which the following is a specification.

My object is to provide a two passenger seat for automobiles and the like in which each of the two passengers will be independently supported and each passenger support will be adapted for vertical reciprocation in a fixed path.

The invention is illustrated, by way of example, in the accompanying drawings in which:

Figure 1 is a view in section and elevation taken transversely of a seat constructed according to the spirit of the present invention.

Fig. 2 is a view in plan illustrating a seat comprising two separate seat cushions for the accommodation of two passengers.

Fig. 3 is a view in transverse section as seen through one of the guide members by which the seat is held for slidable vertical movement.

Fig. 4 is a fragmentary horizontal sectional detail on a plane parallel with Fig. 2.

Referring more particularly to the drawings, 10 indicates the body of a vehicle having a transverse seat wall 11 adapted to form a seat back support. A seat box 12 is formed upon the floor of the body and is provided with a horizontal frame upon which rigid supporting spring frames 13 may be mounted. These frames are designed to suit the vehicle upon which they are placed and are here shown as substantially square in shape. When the frames are of this configuration, two individual seats are formed side by side, as indicated by the numerals 14 and 15 in Fig. 2. A series of helical expansion springs 16 are disposed along the sides of each frame 13 and at the corners thereof for the support of yielding seat frames 17. The helical springs are preferably secured to the spring frames by means of staples and their opposite ends are secured in a like manner to the seat frames. The seat frames are also of a shape similar to the spring frames, they being in this case square and having square central openings 18 through them. Pieces of fabric 19 are stretched over the tops of the frames 17 to receive hair upholstering material 20. This material is then covered with seat covers 21 of leather or fabric to form the seat cushions. The coverings 21 are fastened by upholstering tacks 22 along the forward edges of the seat frames and are continued down to the spring frames, thus forming front aprons 23. The lower edges of the aprons are secured by upholstering tacks or snaps 24 to the fronts of the spring frames. Attention is here directed to the fact that the helical springs 16 are constantly under compression, due to the fact that the aprons 23 are so short that the springs cannot reach their maximum expansion, and also to the fact that flexible back apron members 25 are fastened between the rear edges of the spring frames and the seat frames, thus holding all of the springs under compression for a purpose which will be hereinafter set forth.

The backs 14' and 15' of the seats are independent from the back wall 11 and it will be also understood that the seat frames 17 are likewise independent from all support save that of the springs. These seat backs are formed with rectangular frame-works 26 upon which are mounted helical springs 27 over which cushion linings 28 are stretched. Upholsterings 29 are then placed upon these linings and covered with back coverings 30 which are preferably of the same material as the seat coverings 21. The backs thus formed are connected at their lower edges to the seat frames by means of hinges 31, the backs of the seat frames being beveled, as indicated at 32, to prevent binding of the two members in relation to each other.

The back frames 14ª and 15ª are slidably supported for vertical movement between channels 33, 33ª, 33ᵇ and 33ᶜ, two of which are secured to the body of the car and extend inwardly toward the center of the seat and two of which extend both ways from the center. These channels are substantially vertical and parallel and are engaged by guide rails 34, 34ª 34ᵇ and 34ᶜ which are fixed to the vertical side edges of the back frames 26. In this manner each seat and its back will be held against horizontal movement and will be permitted to move vertically as the springs 16 are compressed and expanded. The channel bars 33ª and 33ᵇ are mounted close together back to back, the channel of the bar 33ª opening toward the channel of the bar 33, and the guide rails 34 and 34ª extending from the back 14ª fit tightly in these channels, and the seat 14 is attached to the back 14ª so that the back goes up and down with the seat. In a like manner the channel of the bar 33ᵇ opens toward the channel of the bar 33ᶜ, and the guide rails 34ᵇ and 34ᶜ fit tightly in these channels and are rigidly connected to the back 15ª, said back being connected to the seat 15. The seats 14 and 15 fit closely together side by side and go up and down independent of each other, this being made possible by the mounting of the backs 14ª and 15ª in the channels 33ª and 33ᵇ. The pair of channel bars 33 and 33ª forms an independent slide-way for the back 14' of the seat 14, and the pair of channel bars 33ᵇ and 33ᶜ forms an independent slide-way for the back 15' of the seat 15. It is preferable to form the channel members 33, 33ª, 33ᵇ, and 33ᶜ of steel or other metal, and the guide rails of fiber. By this construction, objectionable wear and noise will be eliminated from the moving parts and the sudden rebound of the seat will be resisted by the friction of the fiber against the channel within which it slides.

In operation, the seats are assembled as particularly shown in Fig. 1. When occupied in a natural manner with the backs resting against the back cushions, the weight of the occupants will be unequally distributed over the seats, thus causing the backs of the seat cushions to be depressed while the springs under the fronts of the cushions will maintain them in substantially normal positions this action being insured by the constant compression of the springs, as previously described. When a seat frame is depressed it will act through its horizontal connection with its back frame to draw it downwardly and cause its guide rails to slide along the fixed channels. Thus the back and seat will assume a comfortable position in relation to the occupant. While the vehicle is in motion, the slight vibration of the car will be absorbed within the springs, and intense shock will cause a seat and back to simultaneously move downwardly upon the springs 16. This will slip the guides along the channels. As the springs recoil the guides will move upwardly along the channels and the action of the fiber against the metal of the channels will retard the movement to prevent the seat from violently returning to its original position.

Especial attention is called to the fact that a two passenger seat, as shown in Fig. 2, provides an independent support for each of the two passengers so that the support under one passenger is not affected by the weight or lack of weight of the other passenger.

It will thus be seen that the seat here shown is decidedly simple in its construction, will provide a yieldable back and seat support with a minimum spring suspension, and also affords positive means for preventing objectionable recoil of the seat suspending springs.

While I have shown the preferred construction of my vehicle seat as now known to me, it will be understood that various changes in the combination, construction and arrangement of parts may be made by those skilled in the art without departing from the spirit of my invention as claimed

I claim:

In a vehicle seat having a vertically movable seat frame, guides comprising metal channels held in fixed positions to said seat and fiber strips adapted to fit tightly in the channels and slide along said channels with the seat frame.

In testimony whereof I have signed my name to this specification.

CHARLES M. WEBB.